United States Patent [19]
Mendenhall et al.

[11] 3,765,262
[45] Oct. 16, 1973

[54] TRANSMISSION SHIFT CONTROL
[75] Inventors: Charles A. Mendenhall, Rochester; Richard D. Williams, Fairport; Fred G. Michaels, Pittsford; William E. Gifford, Spencerport, all of N.Y.
[73] Assignee: General Motors Corporation, Detroit, Mich.
[22] Filed: June 29, 1972
[21] Appl. No.: 267,669

[52] U.S. Cl..................... 74/473 R, 70/239, 70/248
[51] Int. Cl.... B60r 25/02, B60r 25/06, E05b 65/12
[58] Field of Search..................... 74/473 R; 70/238, 70/239, 247, 248, 252

[56] References Cited
UNITED STATES PATENTS
3,490,255  1/1970  Wight et al. .......................... 70/239
3,703,092  11/1972  Elliott ................................. 70/248

Primary Examiner—Allan D. Herrmann
Attorney—Warren E. Finken et al.

[57] ABSTRACT

The drawings illustrate a transmission shift control including rack and gear means operatively connected to the ignition lock switch for positioning the shift control elements in Neutral upon engine start, with a cable-interlock arrangement between the rack and gear means and the steering column, as well as cam means associated with the rack and gear means for locking the transmission in Neutral when the shift selector lever is in Neutral, while lighting means mounted on the shift selector lever illuminates the selected shift ratio indicia.

11 Claims, 7 Drawing Figures

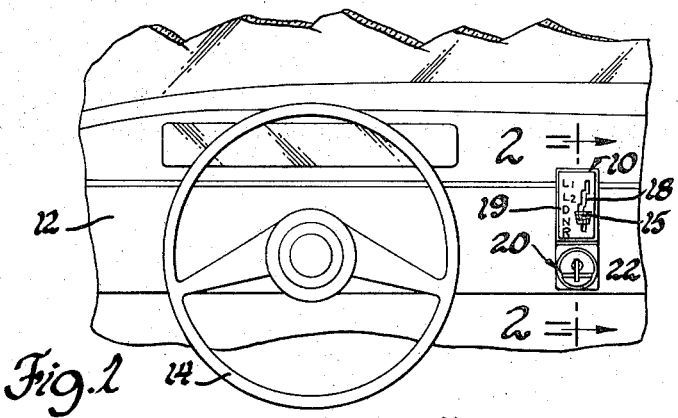
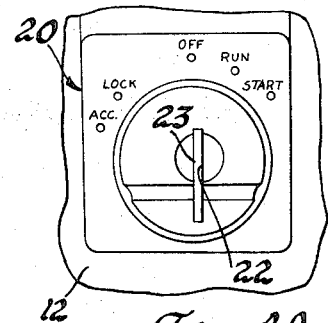
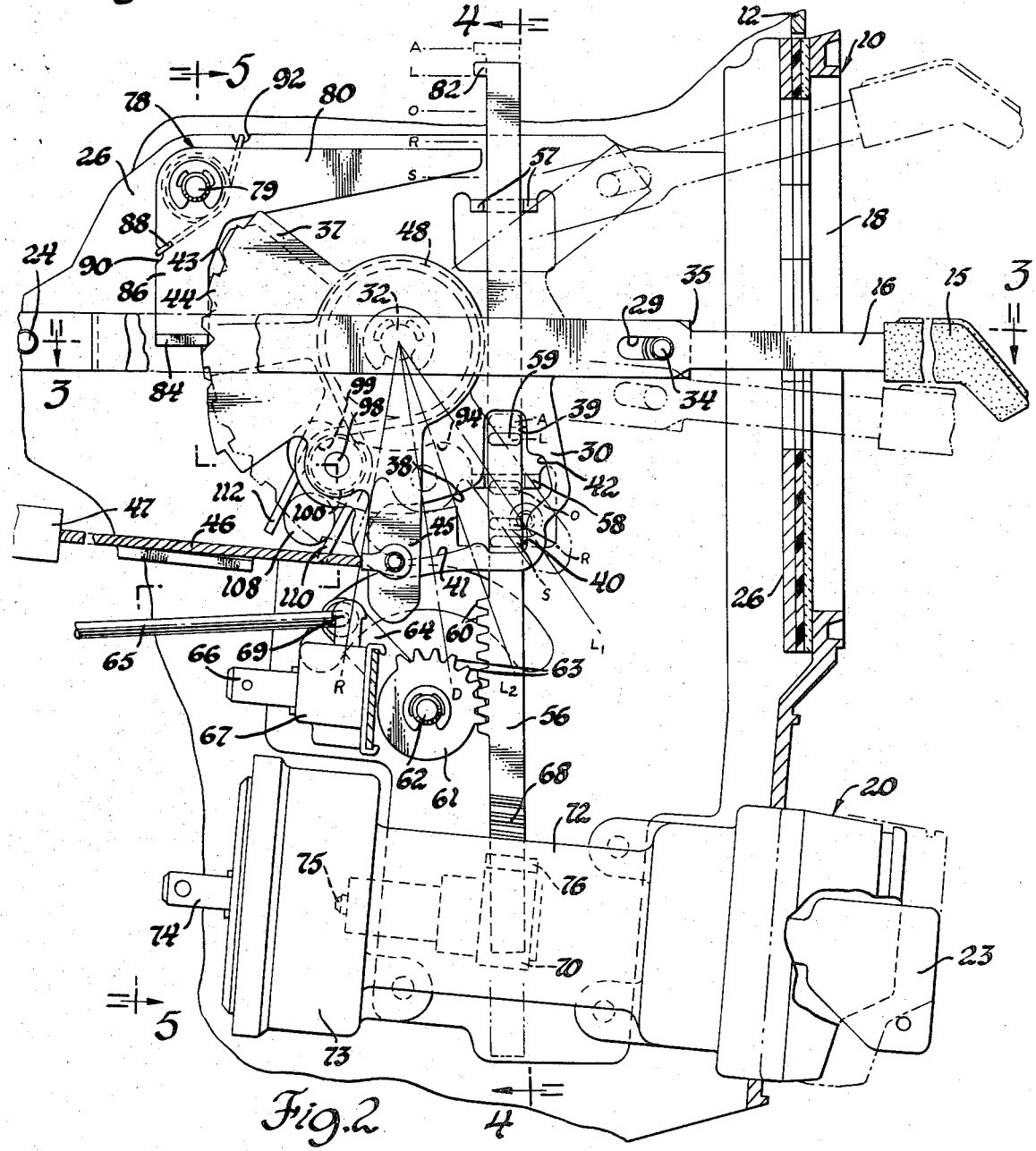

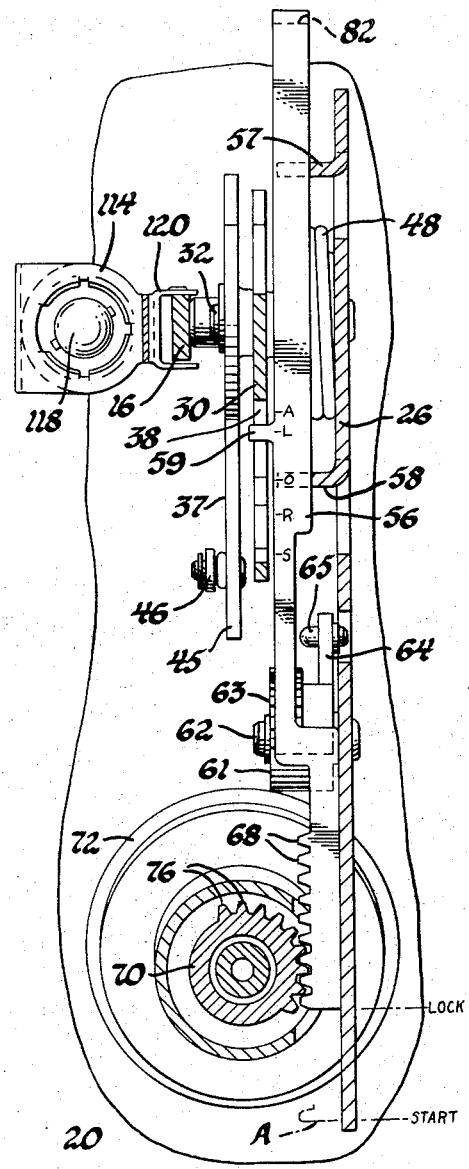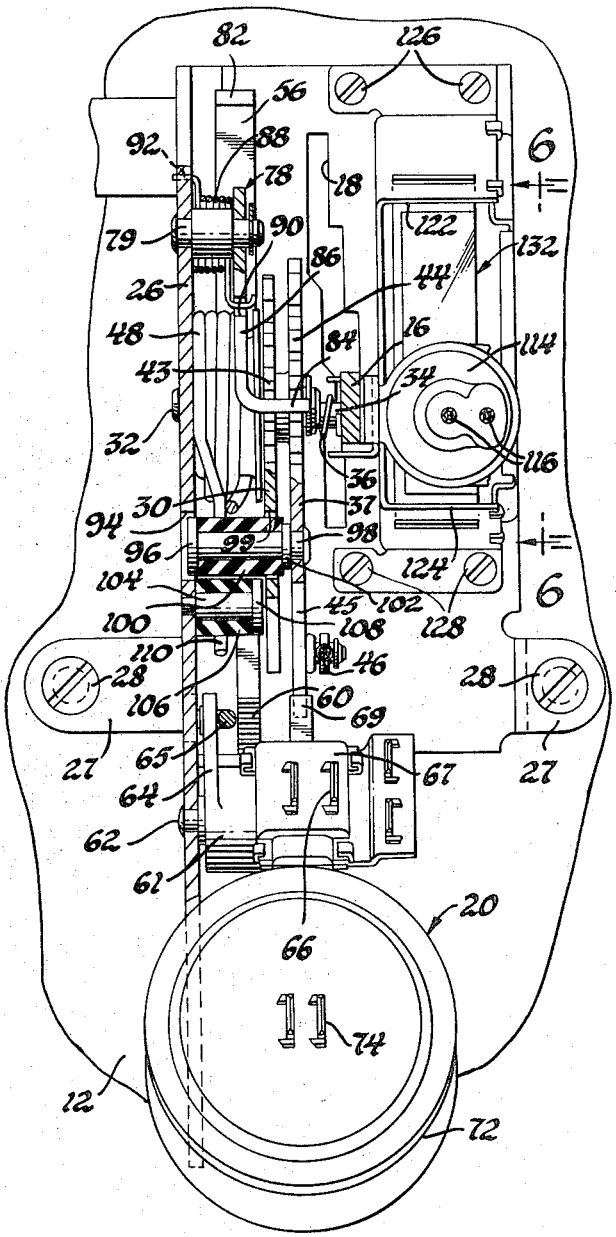
Fig. 4
Fig. 5

TRANSMISSION SHIFT CONTROL

This invention relates generally to control linkage and, more particularly to dash panel-mounted transmission control linkage.

An object of the invention is to provide an improved shift control assembly having all the necessary detents or locking arrangements incorporated therein such that the transmission cable is connectable directly to the transmission spool selector valve, thereby eliminating the need for locking provisions in the transmission.

Another object of the invention is to provide an improved dash panel-mounted shift control assembly having the ignition lock switch integrally formed therein with means for automatically returning the shift selector lever to Neutral upon start-up of the engine.

A further object of the invention is to provide an improved shift control assembly including an interlocking cable arrangement for automatic steering column locking.

Still another object of the invention is to provide an improved shift control assembly having no PARK selector position and including means for requiring that the parking brake be applied and that the shift selector lever be returned to NEUTRAL before the lock cylinder can be turned to the lock position, thereby permitting removal of the key.

A still further object of the invention is to provide an improved shift control assembly including means for illuminating the selected drive ratio position.

These and other objects and advantages of the invention will be apparent when reference is made to the following description and accompanying drawings, wherein:

FIG. 1 is a view of a vehicle dash panel embodying the invention;

FIG. 1A is an enlarged fragmentary view of a portion of FIG. 1;

FIG. 2 is a cross-sectional view taken along the plane of line 2—2 of FIG. 1, and looking in the direction of the arrows;

FIG. 4 is a cross-sectional view taken along the plane of line 4—4 of FIG. 2, and looking in the direction of the arrows;

FIG. 5 is a cross-sectional view taken along the plane of line 5—5 of FIG. 2, and looking in the direction of the arrows.

Figure 3:
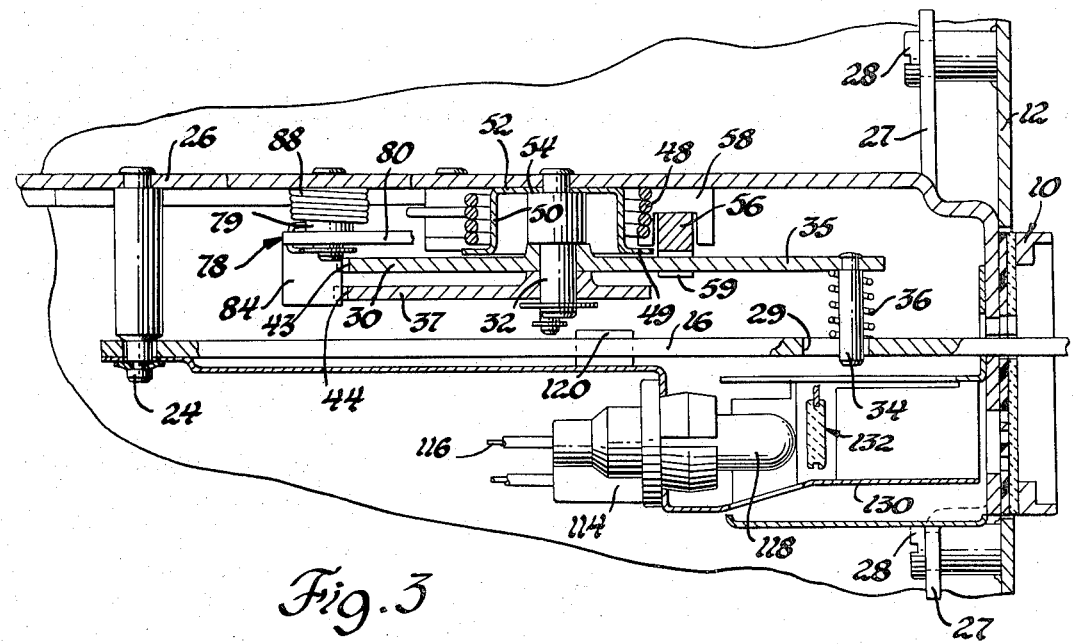
FIG. 3 is a cross-sectional view taken along the plane of line 3—3 of FIG. 2, and looking in the direction of the arrows.

Referring now to the drawings in greater detail, FIG. 1 illustrates the exposed manual control frame portion 10 of a transmission control mechanism mounted on a dash panel 12 of an automotive vehicle adjacent the steering wheel 14, having a handle 15 mounted on a shift control lever 16 (FIG. 2) extending through a stepped slot 18 formed in the frame portion 10 adjacent the usual Reverse (R), Neutral (N), Drive (D), and two Low ($L_1$) and ($L_2$) shift ratio indicia 19. A lock mechanism 20, better seen in FIG. 1A, including a key slot 22, is mounted on the dash panel 12 immediately below the frame portion 10. A key 23 is insertable into the key slot 22.

As may be noted in FIG. 2, the shift control lever 16 extends through the dash panel 12 and is secured adjacent its inner end on a pivot pin 24 secured to a vertical wall 26, the latter being secured by brackets 27 (FIG. 3) and bolts 28 to the back of the dash panel 12. A cam slot 29 is formed in the lever 16 at a point just inside the dash panel 12. A first cam plate 30 is pivotally mounted on a pivot pin 32 secured to the wall 26. A pin 34 (FIG. 3) is secured to an extended coplanar portion 35 (FIG. 3) of the cam plate 30 so as to extend laterally into the cam slot 29, there being a spring 36 mounted between the extension 35 and the lever 16 to urge the lever 16 to the left in FIG. 1 against the selected step of the slot 18. A second cam plate 37 is pivotally mounted on the pivot pin 32 intermediate the first cam plate 30 and the adjacent shift lever 16. A contoured opening 38 is formed in the first cam plate 30 so as to include detent and/or locking portions 39 and 40, and forward and reverse portions 41 and 42. Teeth 43 and 44 are formed on the respective cam plates 30 and 37 on the edges away from the dash panel 12. A downwardly extending lever 45 is formed on the cam plate 37, to which the control cable 46 to the transmission is secured. The cable 46 may connect directly to the transmission spool selector valve, represented generally by 47.

The cam plates 30 and 37 are retained in axial position on the pivot pin 32 by virtue of a spring 48 (FIG. 3) mounted between the wall 26 and a flange 49 formed on a cup member 50 whose end wall 52 is abutted against a shoulder 54 formed on the pin 32.

A vertical rack bar 56 is slidably mounted adjacent the wall 26 between spaced side supports 57 and 58 formed out of the vertical wall 26. A tab or lug 59 is formed on a side of the vertically positioned rack bar 56 extending into the contoured opening 38 formed in the cam plate 30 for the purpose of controlling the movement between the rack bar 56 and the shift lever 16, that is, the tab 59 must be in the O (Off) or R (Run) position to permit movement of shift lever 16 into any selected drive position; and, on the other hand, the shift lever 16 must be in Neutral to permit movement of the tab 59 into S (Start), L (Lock), or A (Accessory), as shown in FIG. 2. A first plurality of teeth 60 are formed on a side of the rack bar 56, 90° away from the lug 59. A first gear segment 61 is mounted on a pivot pin 62 fixed to the wall 26. A plurality of teeth 63 are formed on the gear segment 61 for meshing with the teeth 60 of the rack bar 56. A lever 64 is formed on the gear segment 61. An interlock cable or rod 65 is pivotally secured to the end of the lever 64 and extends to the steering column (not shown). An electrical connector 66 extends from an electrical switch mechanism 67, suitable for connection with a back-up light circuit (not shown). The circuit is completed when a spring-loaded switch member 69 is depressed upon being contacted by the lever 45 when the latter is moved to its reverse position (see FIG. 2).

A second plurality of teeth 68 (FIG. 4) are formed on the rack bar 56 below the teeth 60 and on the same side thereof as the tab 59. A second gear segment 70 (FIG. 4) is mounted in a housing 72 of the lock mechanism 20, the segment 70 being rotatable within the housing 72 by the key 23 (FIG. 2) inserted through the slot 22 (FIG. 1). The key 23 also actuates a standard switch mechanism 73, extending from which is an electrical connector 74 adaptable to being connected to the vehicle ignition system (not shown). A buzzer switch 75 (FIG. 2) is also mounted in the housing 72 and operatively connected to the switch mechanism 73. A plurality of teeth 76 (FIG. 4) are formed on the segment 70 for meshing with the teeth 68 of the rack bar 56.

As illustrated in FIGS. 2 and 3, an L-shaped lever 78 is pivotally mounted on a pivot pin 79 secured to the vertical wall 26. A leg 80 of the lever 78 extends horizontally toward the rack bar 56, terminating at a point below a tab 82 formed on the adjacent side of the rack bar 56. A laterally extending latch or tab 84 (FIG. 5) is formed on the end of a downwardly extending leg 86 of the lever 78. A spring 88, mounted around the pin 79, connects between a notch 90 formed on the outer edge of the leg 86 and a notch 92 formed on an upper edge of the wall 26, urging the latch 84 into contact with the teeth 43 and 44 of the respective cam plates 30 and 37.

Referring now to FIG. 5, it may be noted that an arcuate slot 94 is formed in the wall 26 to accommodate the free movement of a head 96 of a pin 98 mounted through an opening 99 formed in the cam plate 30 and secured to the cam plate 37 adjacent the lever 45. A spacer 100 is mounted between the head 96 and a flange 102 formed on the pin 98 adjacent the cam plate 37. Another pin 104 is positioned just below the pin 98 and secured to the vertical wall 26, there being a spacer 106 mounted between the wall 26 and a head 108 formed on the pin 98. As may be better seen in FIG. 2, the respective ends 110 and 112 of the main spring 48 cross one another and extend past both spacers 100 and 106.

Figure 6:
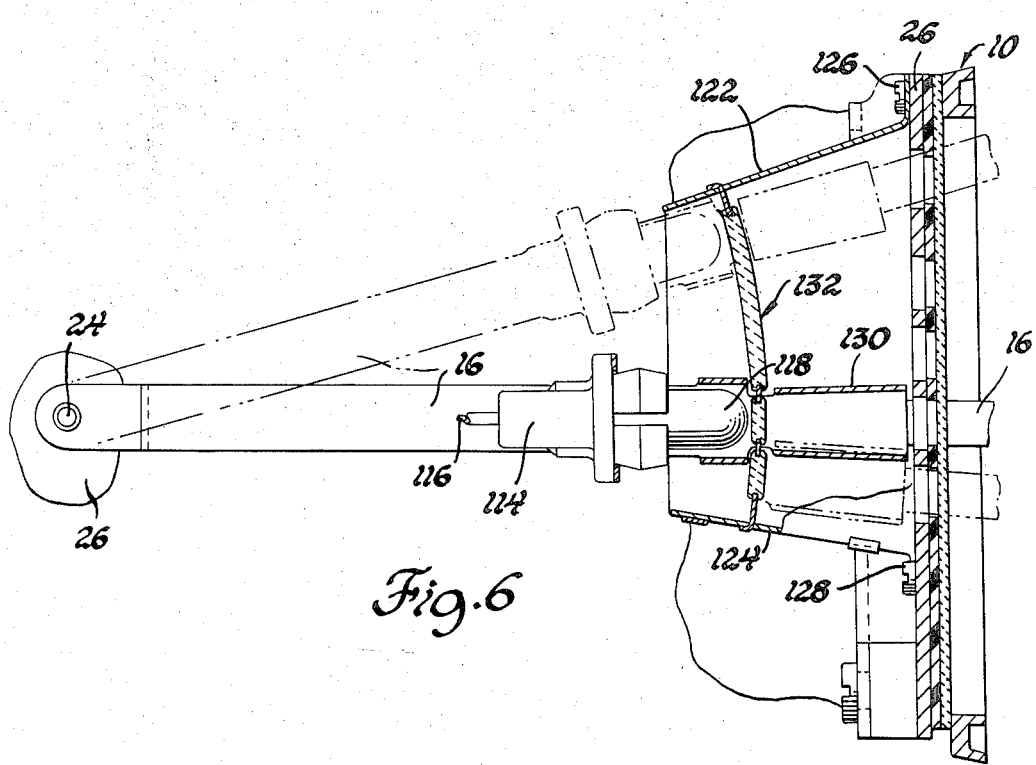
FIG. 6 is a cross-sectional view taken along the plane of line 6—6 of FIG. 5, and looking in the direction of the arrows.

As may be noted in FIGS. 4-6, an electrical socket 114, having wire leads 116 extending therefrom and a light bulb 118 mounted therein, is secured by a bracket 120 to the shift control lever 16 for vertical movement therewith between wall members 122 and 124 secured by respective bolts 126 and 128 to the back surface of the dash panel 12. A tubular member 130 (FIG. 6), extending from the socket 114, directs the light from the bulb 118 to the particular drive ratio position selected, illuminating the appropriate indicia 19 (FIG. 1) adjacent the respective step of the slot 18 (FIG. 5). A plurality of appropriately positioned tinted lenses 132 (FIG. 6) may be secured between the wall members 122 and 124 such that red, amber, and green reflections of the lighted bulb 118 may respectively illuminate the Reverse (R), Neutral (N), and forward position indicia 19.

OPERATION

Rotation of the key 23 serves to rotate the gear segment 70, thereby moving the rack bar 56 via the intermeshing teeth 68 and 76 downwardly from the "lock" position illustrated in FIG. 4 to the "start" position represented by the dash-line A shown at the bottom of FIG. 4. Vertical positions of the tab 59 formed on the rack bar 56 which correspond to the respective "accessories," "lock," "off," "run," and "start" positions of the key 23 shown in FIG. 1A are identified as A, L, O, R, and S in FIGS. 2 and 4. The A and L positions of the tab 59 are illustrated in FIG. 2 as being in the upper locking portion 39 of the contoured opening 38, thereby serving to lock the cam plate 30, as well as the selector lever 16 via the extension 35 of the cam plate 30 and the interconnecting pin 34. The start or S position of the tab 59 is in a lower locking portion 40 of the opening 38, also serving to prevent any movement of the cam plate 30 or the selector lever 16. It may be noted that, while the tab 59 is in either the off or run position, the opening 38 is contoured to include forward and reverse cut-out portions 41 and 42, such that the cam plate 30 may be rotated by the shift lever 16: (1) upwardly (FIG. 2), to the drive and low positions, the tab 59 fitting in the forward portion 41 of the opening 38; and (2) downwardly to the reverse position wherein the tab 59 fits in the reverse portion 42 of the opening 38.

Assume now that the vehicle engine has been started and the key 23 is in the run or R position. The teeth 60 of the rack bar 56 will have rotated the gear segment 61 (FIG. 2) in a clockwise direction, pulling on the lever 64 and the cable 65 to accomplish the unlocking of the steering column. The tab 82 at the upper end (FIG. 2) of the rack bar 56 will have lowered to a position just above the leg 80 of the lever 78. Manual movement of the shift selector lever 16 to the D position, for example, may now be made. This causes the cam plate 30 to pivot in a counterclockwise direction (FIG. 2) about the pin 32, the pin 34 moving toward the other end of the cam slot 29 formed in the lever 16. Such movement of the cam plate 30 rotates the pin 98 in a counterclockwise direction, as illustrated in FIG. 2, spreading the end 110 of the spring 48, while the end 112 of the spring 48 is retained against the fixed spacer 106. Since the pin 98 and the spacer 100 extend through the opening 99 in the cam plate 30, movement of the pin 98 through the arcuate slot 94 causes the other cam plate 37 to move along with the cam plate 30, thereby actuating the transmission cable 46 via the lever 45 formed on the cam plate 37. The respective teeth 43 and 44 of the cam plates 30 and 37 will have ratcheted downwardly past the spring-88-biased latch 84 to a position corresponding to the selected drive position of the shift lever 16. The latter position is then retained by the latch 84 meshing with the adjacent upper teeth 43 and 44.

If the selector lever 16 is thereafter moved to reverse position, for example, both cam plates 30 and 37 will be rotated in a clockwise direction via the pin 98, the leg-end 110 of the spring 48 serving to assist the downward movement of the lever 16.

By referring once again to FIG. 2, it may be noted that the tab 82 causes the lever 80 and, hence, the transmission control cable 46, to automatically return to the Neutral position during the engine start-up process by virtue of unlatching the tab 84, thereby allowing the spring 48 to drive the plates 30 and 37 to the Neutral position.

It may be noted also that the transmission, via the cable 46, is locked in Neutral when the selector lever 16 is moved to N and the key 23 is rotated to off by virtue of the tab 59 being positioned in the upper pocket or portion 39 of the opening 38 in the cam plate 30.

It is also apparent that the steering column is automatically locked via the cable 65 when the key 23 is moved to the lock position by virtue of the interlocking arrangement provided by the intermeshing gear segment teeth 63 and the rack bar teeth 60.

Furthermore, illumination of the selected drive ratio indicia 19 is provided by the lighting arrangement mounted for movement with the selector lever 16.

While but one embodiment of the invention has been shown and described, other modifications thereof are possible.

We claim:

1. A control linkage system comprising a pivotally mounted operating lever, cam plate means mounted for rotation in response to manual movement of said operating lever, latch means for retaining said cam plate means in selected rotary positions, means formed on said cam plate means for securing an actuating cable thereto, a contoured opening formed in said cam plate means including locking and drive ratio portions, a bar member mounted for reciprocal movement adjacent said cam plate means, a tab formed on said bar member and adapted to extend into said contoured opening, a rotatable lock mechanism, means formed on said lock mechanism for reciprocally moving said bar member in response to manual rotation of said lock mechanism, the resultant movement of said tab in said contoured opening being such that said cam plate means is locked when said tab is positioned in said locking portion and rotatable by manual movement of said operating lever into selected reverse and forward drive positions when said tab is positioned in said drive ratio portion.

2. A control linkage system comprising a pivotally mounted operating lever, cam plate means mounted for rotation in response to manual movement of said operating lever, latch means for retaining said cam plate means in selected rotary positions, means formed on said cam plate means for securing an actuating cable thereto, a contoured opening formed in said cam plate means including two locking and two drive ratio portions, a bar member mounted for reciprocal movement adjacent said cam plate means, a tab formed on said bar member and adapted to extend into said contoured opening, a rotatable lock mechanism, means formed on said lock mechanism for reciprocally moving said bar member in response to manual rotation of said lock mechanism, the resultant movement of said tab in said contoured opening being such that said cam plate means is locked when said tab is positioned in one of said two locking portions and rotatable by manual movement of said operating lever into selected reverse and forward drive positions when said tab is positioned on a line between said two drive ratio positions.

3. A control linkage system comprising an operating lever pivotally mounted on a fixed support, first and second cam plates rotatably mounted on said fixed support, latch means for retaining said first and second cam plates in selected rotary positions, lost motion connection means between said first cam plate and said operating lever, a contoured opening formed in said first cam plate, an opening formed in said first cam plate, a lever arm formed on said second cam plate, a transmission cable connected to said lever arm, a first pin member secured to said second cam plate and extending into said opening, a second pin member secured to said fixed support, a spring having its ends straddling said first and second pin members and urged toward one another, a toothed rack bar mounted adjacent said first cam plate, a tab formed on said rack bar and extending into said contoured opening, and a lock mechanism including a gear segment in mesh with said toothed rack bar.

4. The control linkage system described in claim 3, wherein said contoured opening includes oppositely disposed locking position portions for said tab, and transversely positioned oppositely disposed reverse and forward position portions for said tab.

5. The control linkage system described in claim 3, and a second tab formed on said rack bar for contacting said latch means and releasing same from said first and second cam plates when said lock mechanism is in start position.

6. The control linkage system described in claim 3, and a second gear segment rotatably mounted on said fixed support, a second lever arm formed on said second gear segment, and a steering column cable connected to said second lever arm.

7. The control linkage system described in claim 3, and a back-up light switch mounted adjacent said first-mentioned lever arm so as to be actuated thereby when said first cam plate is rotated to reverse position.

8. The control linkage system described in claim 3, and vehicle ignition switch means operatively connected to said lock mechanism.

9. The control linkage system described in claim 3, and fixed transmission ratio indicia, a light source mounted on said operating lever for movement therewith, and fixed lens means mounted intermediate said light source and said fixed transmission ratio indicia.

10. A control linkage system comprising transmission ratio indicia mounted on a vehicular dash panel, slotted openings formed on said dash panel adjacent said indicia, an operating lever pivotally mounted on a fixed support and alternately extending through said slotted openings, first and second cam plates rotatably mounted on said fixed support, spring-loaded latch means for retaining said first and second cam plates in selected rotary positions, lost motion connection means between said first cam plate and said operating lever, resilient means operatively connected to said lost motion connection means for urging said operating lever away from said first cam plate and against a side of said respective slotted openings, a contoured opening formed in said first cam plate and having oppositely disposed locking position portions and transversely oppositely disposed reverse and forward position portions, an opening formed in said first cam plate, a lever arm formed on said second cam plate, a transmission cable connected to said lever arm, a first pin member connected to said second cam plate and extending through said opening, a second pin member secured to said fixed support, a spring having its ends straddling said first and second pin members and urged toward one another, a toothed rack bar mounted adjacent said first cam plate, a tab formed on said rack bar and extending into said contoured opening, and a lock mechanism including a gear segment in mesh with said toothed rack bar for reciprocally moving said rack bar.

11. A control linkage system comprising transmission ratio indicia mounted on a vehicular dash panel, slotted openings formed on said dash panel adjacent said indicia and forming a stepped path therealong, an operating lever pivotally mounted on a fixed support and alternately extending through said slotted openings, first and second cam plates rotatably mounted on a pivot pin secured to said fixed support, a plurality of indentations formed along an edge of each of said cam plates, spring-loaded latch means cooperable with said plurality of indentations for retaining said first and second cam plates in selected rotary positions, a longitudinal slot formed in said operating lever, a pin secured to said first cam plate and extending into said longitudinal slot to form lost motion connection means between said first cam plate and said operating lever, a first coil spring mounted around said pin and compressed between said first cam plate and said operating lever for urging said operating lever away from said first cam plate and against a side of said respective slotted openings, a contoured opening formed in said first cam plate and having north and south oppositely disposed locking position portions and east and west oppositely disposed reverse and forward position portions, an opening formed in said first cam plate, a lever arm formed on said second cam plate, a transmission cable connected to said lever arm, a first pin member secured to said second cam plate and extending through said opening in said first cam plate, a second pin member secured to said fixed support, a second coil spring mounted around said pivot pin and having straight extensions formed on the ends thereof straddling said first and second pin members and urged toward one another, a toothed rack bar mounted adjacent said first cam plate, a tab formed on said rack bar and extending into said contoured opening, and a lock mechanism including a gear segment in mesh with said toothed rack bar for reciprocally moving said rack bar and thereby repositioning said tab in said contoured opening.

* * * * *